Nov. 4, 1969        J. J. CUNHA        3,476,405

DETACHABLE RUNNING GEAR FOR VEHICLES

Filed Dec. 17, 1968        7 Sheets-Sheet 1

INVENTOR.
JOSEPH J. CUNHA
BY Naylor + Neal
ATTORNEYS

Nov. 4, 1969　　　　　　J. J. CUNHA　　　　　3,476,405
DETACHABLE RUNNING GEAR FOR VEHICLES
Filed Dec. 17, 1968　　　　　　　　　　　　7 Sheets-Sheet 2

INVENTOR.
JOSEPH J. CUNHA
BY
*Naylor + Neal*
ATTORNEYS

Nov. 4, 1969  J. J. CUNHA  3,476,405
DETACHABLE RUNNING GEAR FOR VEHICLES
Filed Dec. 17, 1968  7 Sheets-Sheet 3

INVENTOR.
JOSEPH J. CUNHA
BY Naylor & Neal
ATTORNEYS

Nov. 4, 1969  J. J. CUNHA  3,476,405
DETACHABLE RUNNING GEAR FOR VEHICLES
Filed Dec. 17, 1968  7 Sheets-Sheet 5

INVENTOR.
JOSEPH J. CUNHA
BY Naylor & Neal
ATTORNEYS

United States Patent Office 3,476,405
Patented Nov. 4, 1969

3,476,405
DETACHABLE RUNNING GEAR FOR VEHICLES
Joseph J. Cunha, Castro Valley, Calif., assignor to Cunha Products, Inc., Hayward, Calif., a corporation of California
Continuation-in-part of application Ser. No. 627,974, Apr. 3, 1967. This application Dec. 17, 1968, Ser. No. 786,825
Int. Cl. B60f 5/00; B62d 53/04
U.S. Cl. 280—415
14 Claims

ABSTRACT OF THE DISCLOSURE

A dolly adapted to be coupled beneath a load carrying body to provide wheeled support therefor. The dolly is nestable in longitudinal alignment with the body or, in certain embodiments, another similar dolly. The latter arrangement provides an assemblage having a load supporting capacity greater than that of a single dolly. This assemblage is also adapted to be coupled beneath a load carrying body to provide wheeled support therefor. The dolly, or the assemblages thereof, are also adapted for use in adding load carrying axles to draft vehicles.

This application is a continuation-in-part of my copending application Ser. No. 627,974, filed Apr. 3, 1967 and now abandoned. The present invention relates to dolly-like running gear of the type disclosed in my patent Nos. 3,246,912 and 3,312,479 and in copending application Ser. No. 683,575, filed Nov. 16, 1967.

More particularly, the invention relates to dolly-like running gear for selective attachment to load carrying bodies to provide primary or secondary wheeled support therefor. In its more specific aspects, the invention is concerned with such running gear adapted to be assembled in tandem groups to provide various combinations of multiple axles for the wheeled support.

In the prior art, wheel supported dollies for use in combination with load carrying bodies of the semitrailer type are very common. These dollies are typically provided either as secondary forward or rearward running gear. Some prior art has even suggested employing dollies as the primary running gear for load carrying bodies where the bodies are provided with no permanently secured running gear.

Prior art dollies have had the shortcoming, however, that they made no provision whereby the axle support provided thereby could be readily varied without the substitution of a completely different dolly. As a result, it has been necessary to provide specially constructed different dollies wherever a change in the axle support to be provided by a dolly is required.

Another shortcoming of prior art dollies is that they require difficult and time consuming installation when used as rearward running gear on a load carrying body. This short-coming has been common both to dollies intended for primary and secondary running gear. It has, naturally, resulted in a reluctance to use dollies as rearward running gear on load carrying bodies. This reluctance is particularly evident from the absence of any commercially significant employment of dollies for rearward running gear by the semitrailer industry.

In summary, the present invention solves the problems typically existent in the prior art by providing a dolly having a wheel supported chassis facilitated for ready placement in load supporting relationship with a cargo carrying body. In the preferred embodiments, the chassis of the dolly is provided with forwardly and rearwardly disposed coupling elements mutually engageable with mating coupling elements on a corresponding dolly to establish a longitudinally aligned tandem relationship therewith. Through this provision, a load supporting assemblage comprised of a plurality of dollies may be provided. The number of dollies in the assemblage may be selectively varied and, whenever desired, the dollies within the assemblage may be separated and used individually, or in subassemblages.

In the preferred embodiments of the invention, when the dolly is used as the rearward running gear on a cargo carrying body, mutually engageable connection means are provided on the body in the chassis of the dolly to maintain the dolly, or an assemblage comprised of a plurality of dollies, in longitudinal alignment with the body. When the dolly is used as the forward running gear on a cargo carrying body, it is preferable to provide load supporting means on the chassis of the dolly adapted to facilitate pivotal movement of the chassis relative to the body about a vertical axis. In the preferred embodiments, when an assemblage comprised of a plurality of the dollies is employed as forward running gear, this load supporting means is adapted to uniformly distribute the load imparted thereto to the dollies in the assemblage.

It is, accordingly, a principal object of the present invention to provide a dolly adapted for use as primary or secondary running gear on a cargo carrying body which avoids the disadvantages of the prior art.

Another object of the invention is to provide mutually engageable coupling elements on the dolly and cargo carrying body adapted to releasably secured the dolly in predetermined load supporting relationship with the body.

Yet another object of the invention is to provide a dolly adapted to be nested in longitudinally aligned tandem relationship with a corresponding dolly to increase its load supporting capacity.

Still another object of the invention is to provide load supporting means adapted to distribute the load between the dollies when in nested relationship.

The foregoing and other objects and the specific details of the invention will become more apparent when viewed in light of the accompanying drawings, wherein.

THE FIRST EMBODIMENT DOLLIES

Referring now specifically to the construction illustrated in FIGS. 1 to 5, the basic dolly therein is designated by the numeral 10. The chassis of the dolly 10 is comprised of side members 12 and 14 rigidly interconnected by transverse members 16 and 18. Wheel support for the chassis is provided by a suspension arrangement comprising: spring hangers 20 and 22 fixed to and depending downwardly from each of the side members 12 and 14; a leaf spring 24 secured between each pair of the hangers 20 and 22; an axle 26 secured to and extending between the springs 24 transversely of the chassis; and, wheels 28 rotatably received on the axle 26.

Figure 1:
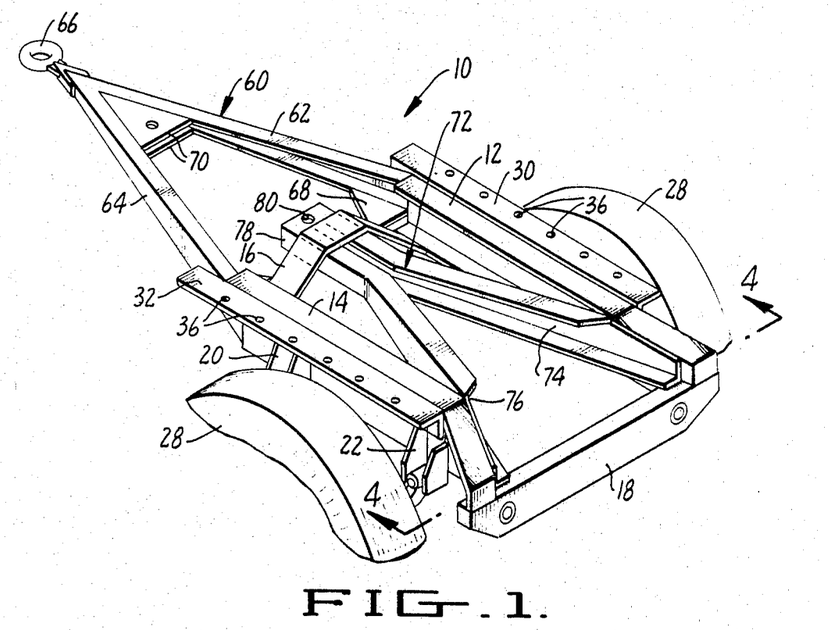
FIG. 1 is a partial perspective view illustrating a first embodiment of the dolly with the load carrying fifth wheel removed therefrom for purposes of illustration.
Figure 2:
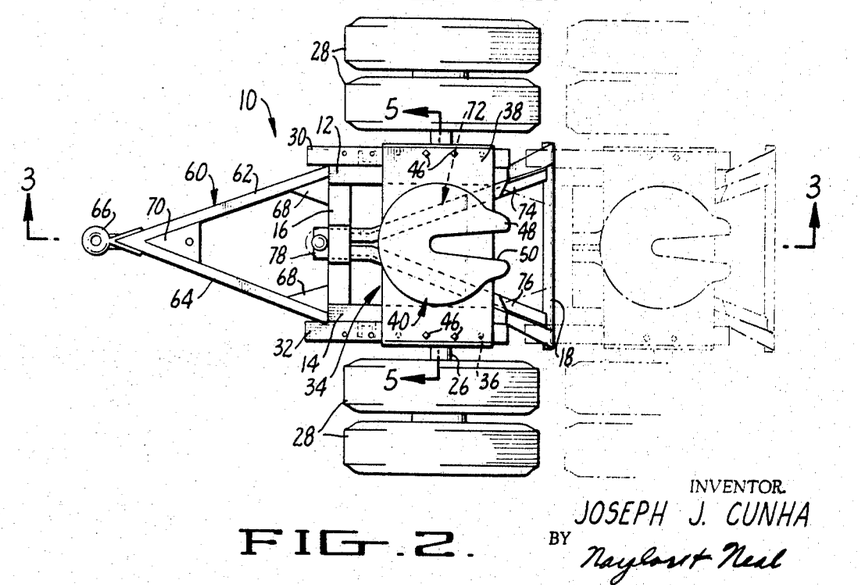
FIG. 2 is a plan view of the first embodiment dolly illustrating, in phantom line representation, a corresponding dolly nested in tandem relationship therewith.

The side members 12 and 14 have rails 30 and 32, respectively, fixedly secured in parallel relationship to their outer surfaces. These rails are provided to support a fifth wheel structure 34 and each have formed therethrough a plurality of mutually spaced apertures 36 to facilitate longitudinal positioning of the fifth wheel structure at selectively variable locations on the chassis. The fifth wheel structure 34 comprises: a support plate 38 slidably received on the rails 30 and 32; and, a fifth wheel 40 of relatively conventional nature mounted on the plate 38 for pivotal movement about a transverse horizontal axis defined by the mounting journals thereeof, designated by the numeral 42. The plate 38 includes flanged end portions 44 fixed thereto for sliding engagement with the rails 30 and 32 to maintain longitudinal alignment between the rails and plate. Locking of the plate 38 at select longitudinal positions relative to the chassis is provided by bolts 46 extensible through apertures in the plate adapted to be aligned with select pairs of the apertures 36 in the rails.

The conventional structure of the fifth wheel 40 comprises: a table 48 having a keyhole 50 opening through its rearward end; a kingpin locking jaw 52 mounted beneath the table 48 for selective engagement with a kingpin received in the apex of the hole 50; and, first and second pairs of mounting plates 54 and 56 pivotally secured together by the journals 42 and fixed, respectively, to the table 48 and plate 38. A kingpin, designated by the numeral 58, is shown in phantom lines in FIG. 5 to illustrate the manner in which the locking jaw 54 operates.

The dolly 10 is provided with a forwardly extending tongue 60 of generally V-shaped planar configuration. The tongue 60 comprises forwardly converging side members 62 and 64 fixed to the side members 12 and 14, respectively, of the chassis. A coupling eye 66 is fixed to the apex of the tongue 60 and gusset plates 68 rigidify the connection between the base of the tongue and the chassis. The plates 68 are secured between the side members 62 and 64 and the transverse chassis member 16. Rigidity of the tongue 60 is further enhanced by gusset plates 70 rigidly secured between the side members 62 and 64.

In addition to being of generally V-shaped planar configuration, the tongue 60 is of generally wedge shaped elevational configuration. This characteristic may be seen from FIG. 3 and is provided by fabricating the side members 62 and 64 as channels having the lower walls thereon converging towards their upper walls.

Figure 3:
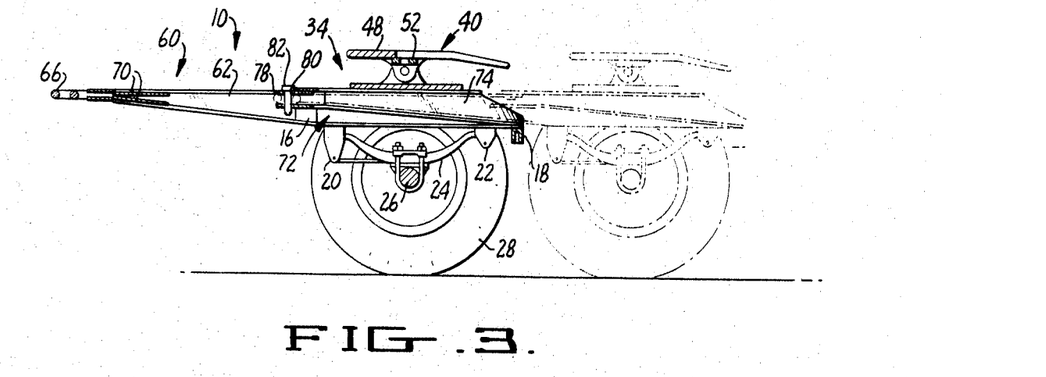
FIG. 3 is a sectional view taken on the plane designated by line 3—3 of FIG. 2.
Figure 4:
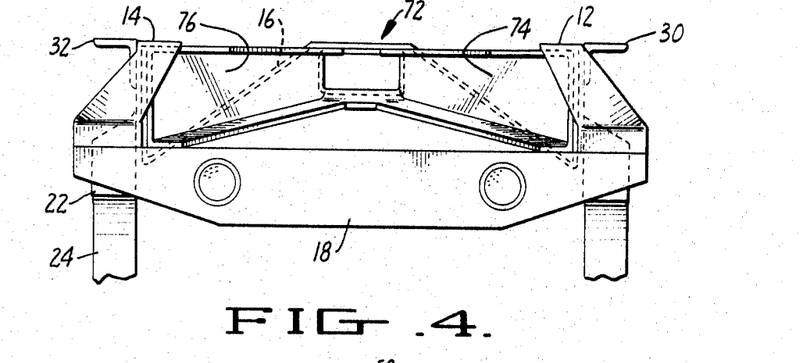
FIG. 4 is a sectional view taken on the plane designated by line 4—4 of FIG. 1.
Figure 5:
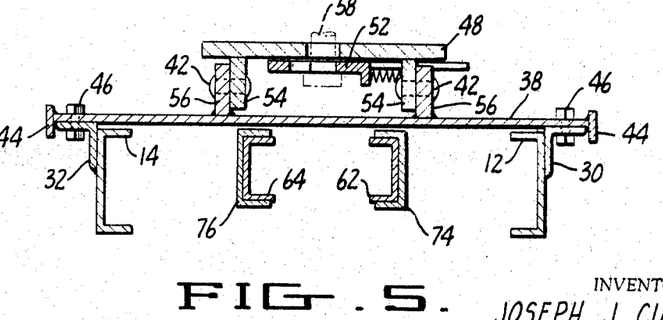
FIG. 5 is a sectional view taken on the plane designated by line 5—5 of FIG. 2.

The chassis of the dolly 10 has fabricated therein a V-shaped socket 72 interiorly nestable in seated engagement with the exterior surfaces of the tongue 60 on a corresponding dolly. The socket 72 is fabricated of a pair of channel members 74 and 76 arranged in forwardly converging relationship between the rearward transverse member 18 and the forward transverse member 16. The channel members 74 and 76 are fixed relative to the transverse members 16 and 17 and converge at a forwardly extending longitudinal section 78 having an aperture 80 therein adapted to assume aligned relationship with the opening in the eye 66 of a tongue 60 nested in the socket 72. Through the latter interrelationship, when a tongue is seated within the socket 72, it may be selectively locked in this condition by inserting a pin through the aperture 78 and the aligned eye of the tongue therebelow. A phantom line representation of a pin, designated by the numeral 82, employed for this purpose is illustrated in FIG. 3.

Attention is herein invited to the mating character of the external and internal surfaces on the tongue 60 and socket 72, respectively. Specifically, when in nested condition, both the lateral and the upper and lower walls of the channels defining the tongue and socket seat in mutually engaged condition. Thus, when a pair of dollies constructed according to the invention are nested together, as illustrated by the solid and phantom line representation in FIGS. 2 and 3, both relative lateral and elevational movement between the chassis of the respective dollies is prevented. In the latter condition, the dollies are maintained in longitudinally aligned tandem relationship with their chassis coplanar. Thus, an integrated assemblage of dollies capable of providing complementary support is provided by the dollies. Although FIGS. 2 and 3 illustrate such an assemblage comprised of only one pair of dollies, it should be appreciated that additional corresponding dollies may be similarly nested with either the forward or rearward dolly of the assemblage where desired.

Figure 6:
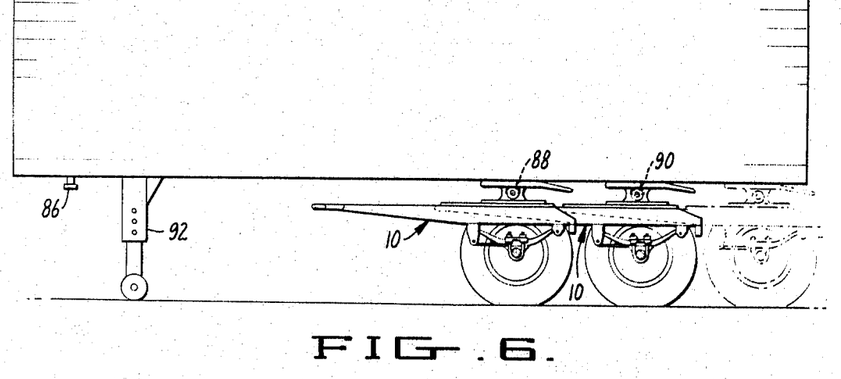
FIG. 6 is an elevational view illustrating a pair of the first embodiment dollies coupled beneath a semitrailer-like body by a kingpin attaching technique to provide the primary rearward running gear therefor and illustrating, in phantom line representation, the manner in which a third such dolly might be employed to augment the dolly support.

FIG. 6 illustrates a cargo carrying body 84 similar to that typically employed with semitrailers, with the exception that it is not provided with permanent primary running gear at its rearward end. The only permanent running gear on the body 84 comprises: a forward kingpin 86; a pair of rearward kingpins 88 and 90; and, a retractable ground support 92. Even this permanent gear may be completely retracted or removed when it is desired. In addition to these specific elements, each of the kingpins 86, 88 and 90 is surrounded by load bearing surface (not illustrated) of conventional nature designed for mutual supporting engagement with the upper surface of a fifth wheel.

Because of the absence of permanent primary running gear from the body 84, it is ideally suited for employment in environments where running gear is intermittently, unnecessary. Such environments are typical in the art of "piggy-back" cargo bodies. The employment of the body 84 also has the advantage, as will become more apparent subsequently, that the amount of primary running gear provided thereon may be readily varied. Thus, the running gear for the body may be tailored to meet its load.

Primary rearward running gear for the body 84 is provided for coupling a pair of the dollies 10 in nested engagement, as illustrated in FIGS. 2 and 3, and then coupling the fifth wheels of the dollies to the kingpins 88 and 90. The solid line representations of the dollies 10 in FIG. 6 illustrate this provision. It should be understood that when so provided, the dollies 10 are maintained against lateral movement relative to each other by the nested engagement therebetween and against lateral movement relative to the body 84 by the engagement of the kingpins 88 and 90 with the fifth wheels. The dollies are similarly maintained against relative elevational movement with respect to each other and the body 84.

With the arrangement illustrated in FIG. 6, if desired, the number of dollies in the primary support assemblage may be increased to three. This provision is illustrated by the phantom line representation. It is effected simply by coupling the dolly shown in phantom lines in nested engagement with the dolly immediately in front of it. When provided in this manner, the fifth wheel of the dolly represented in phantom engages the under surface of the body 84 to impart support thereto. No kingpin engagement with the fifth wheel on the dolly represented in phantom lines is necessary.

Figure 7:
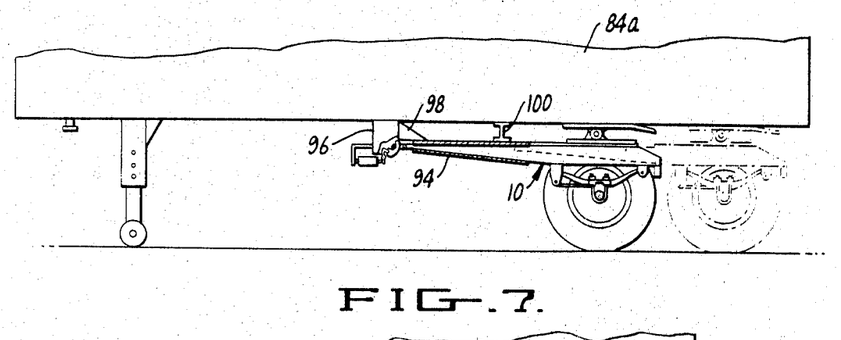
FIG. 7 is an elevational view, partially in section, illustrating one of the first embodiment dollies coupled beneath a semitrailer-like body by a tongue engaging socket technique to provide the primary rearward running gear therefor and illustrating, in phantom line representation, the manner in which a second such dolly might be employed to augment the dolly support.

Referring now to FIG. 7, therein is illustrated a body 84a differing from the body 84 only in that it is provided with an alternative arrangement for coupling the rearward primary running gear in place. Similarly to the body 84, the body 84a is provided with no primary running gear. The coupling arrangement for the running gear on the body 84a comprises a socket 94 adapted to assume nested engagement with the tongue of one of the dollies 10. The socket 94 corresponds substantially in construction with the aforedescribed socket 72, with the exception that a pneumatically operated coupling 96 is used in place of the pin and aperture arrangement 80, 82. The coupling 96 is secured directly to the underside of the body 84a and includes a gusset 98 to lend forward support to the socket 94. Rearward support of the socket 94 is provided by a transverse beam 100 secured between the underside of the body 84a and the upper side of the socket.

In operation, primary rearward running gear is provided for the body 84a by nesting a dolly in the socket 94 and activating the coupling 96 to engage the eye 66 on the dolly. Upon assuming this condition, the fifth wheel on the dolly engages the underside of the body 84a to impart support thereto. No kingpin connection between the fifth wheel and the body is required. If desired, an additional axle may be readily provided by nesting a second dolly in seated engagement with the first dolly, as illustrated by the phantom line representation in FIG. 7. The fifth wheel on such a second dolly is maintained in engagement with the underside of the body 84a by the interconnection of its tongue with the first dolly and no kingpin attachment to the body is necessary.

Figure 8:
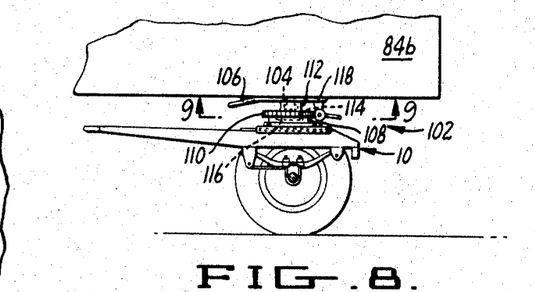
FIG. 8 is a partial elevational view illustrating one of the first embodiment dollies coupled beneath a semitrailer-like body by a kingpin attaching technique to provide the primary running gear therefor and further illustrating a rotatable fifth wheel construction for use on the dolly to facilitate its connection and alignment with the body.
Figure 9:
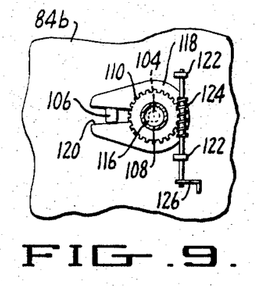
FIG. 9 is a sectional view taken on the plane designated by line 9—9 of FIG. 8.

Referring now to FIGS. 8 and 9, therein is illustrated an embodiment of the dolly 10 employing a modified fifth wheel construction 102 and a body 84b for use in combination with the dolly. With the exception of the fifth wheel, the dolly 10 corresponds identically to that illustrated and described with respect to FIGS. 1 to 5. The body 84b differs from the body 84 only in that it employs a kingpin 104 and longitudinally aligned wedge 106 fixed to its underside in place of the kingpins 88 and 90.

A plate 38 corresponding to that of the dolly illustrated in FIGS. 1 to 5 supports the fifth wheel 102. The fifth wheel 102 comprises: a primary pedestal 108 fixed to the plate 38; a horizontally disposed gear 110 fixed to the pedestal 108; a secondary pedestal 112 rotatably received for movement about a vertical axis in an opening 114 therefor in the gear 110; an enlarged support head 116 formed on the pedestal 112 beneath the opening 114 in rotatable thrust bearing engagement with an interior surface (not illustrated) formed on the primary pedestal 108; a load supporting table 118 fixed to the secondary pedestal 112, said table having a key slot 120 opening through one edge thereof; a pair of journal brackets 122 fixed to and depending downwardly from the underside of the table 118; and, a worm gear 124 rotatably received in the brackets 112 in mating engagement with the gear 110. A crank 126 is fixed to one end of the worm gear 124 to selectively impart rotation thereto and, preferably, a detent (not illustrated) is provided to selectively lock the crank against rotation.

Through the aforedescribed fifth wheel construction, the table 118 may be rotated about a vertical axis relative to the dolly 10 by turning the crank 126. Thus, the table may be turned to positions wherein the key slot 120 opens either rearwardly or forwardly of the dolly 10.

In operation of the FIGS. 8 and 9 embodiments, the dolly 10 is engaged in supporting relationship with the underside of the body 84b by backing it into a position wherein both the kingpin 104 and wedge 106 are received in the key slot 120. During this operation, the body is supported above the surface of the ground. Any suitable fixture may be used for this purpose. Once so engaged, a kingpin locking jaw on the table 118 (not illustrated) is engaged with the kingpin 104 to prevent removal of the kingpin and the wedge 106 from the slot 120. Thus, since both the kingpin 104 and wedge 106 mate with the slot 120, the table 118 is locked against movement relative to the body 84b. In this condition, the crank 126 may be activated to turn the dolly 10 relative to the body 84b.

The arrangement of FIGS. 8 and 9 has the advantage that the tongue of the dolly 10 may be extended rearwardly of the body 84b during installation of the dolly beneath the body and, subsequently, turned to a position extending forwardly of the body. Thus, the tongue of the dolly may be conveniently employed to force it into position beneath the body. Similarly, when it is desired to remove the dolly, the tongue may be turned to a rearwardly extending condition wherein it may be conveniently employed to pull the dolly from beneath the body. The mounting arrangement for the fifth wheel 102 also facilitates turning of the table either before or after installation of the dolly 10 beneath the body 84b.

Figure 10:
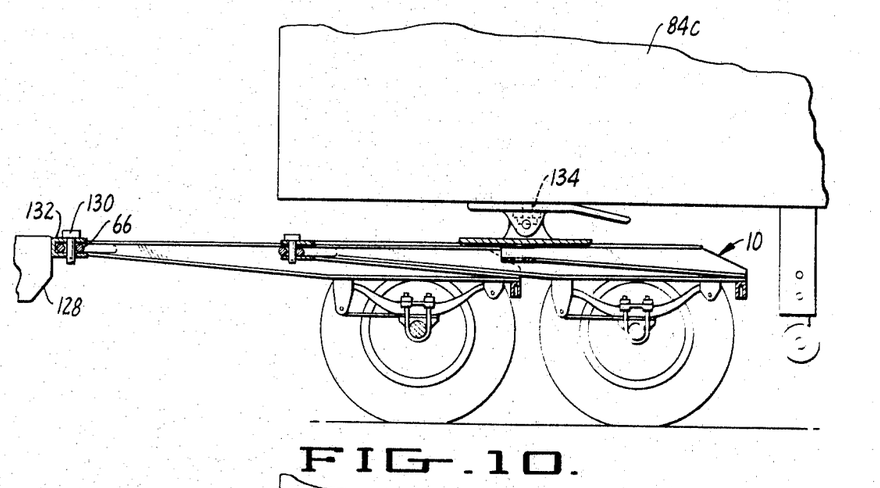
FIG. 10 is an elevational view, partially in section, illustrating a pair of the first embodiment dollies coupled beneath a semitrailer-like body by a kingpin connection to provide a primary forward running gear for the body.

Referring now to FIG. 10, therein is illustrated an arrangement wherein a pair of the dollies 10 are employed as forward running gear for a semitrailer-like body 84c. The body 84c may be of conventional semitrailer type, or correspond to any one of the aforedescribed bodies 84, 84a or 84b. In this arrangement, the dollies are nested together as illustrated in FIGS. 2 and 3 and one of the fifth wheels is removed therefrom. The remaining fifth wheel is then moved to a position where the plate 38 thereof bridges the rails 30 and 32 on the respective dollies. Once so positioned, the plate 38 is locked against longitudinal movement relative to the dollies by engaging the bolts 46 through the openings therefor provided in the plate 38 and aligned openings 36 in the rails 30 and 32. In the preferred arrangement, the plate 38 is locked in a position locating the fifth wheel centrally between the axes of the nested dollies. It is here noted that upon nesting of a pair of dollies constructed according to the invention, the rails 30 and 32 of the respective dollies assume longitudinally aligned closely spaced end to end relationship.

With the dollies arranged as illustrated in FIG. 10, they are employed in much the same manner that single dollies are conventionally employed. Specifically, the tongue of the forward dolly is coupled to a draft vehicle, designated by the numeral 128, by a pintle 130 engaged to a clevis 132 provided on the draft vehicle and the eye 66 on the tongue. In this condition, the draft vehicle is simply backed beneath the body 84c to a position wherein the fifth wheel engages the forward kingpin, designated by the numeral 134 on the body. Once so positioned, the kingpin locking jaw of the fifth wheel is engaged with the kingpin 134 and supporting draft engagement is established between the body 84c and the dolly assemblage.

Figure 11:
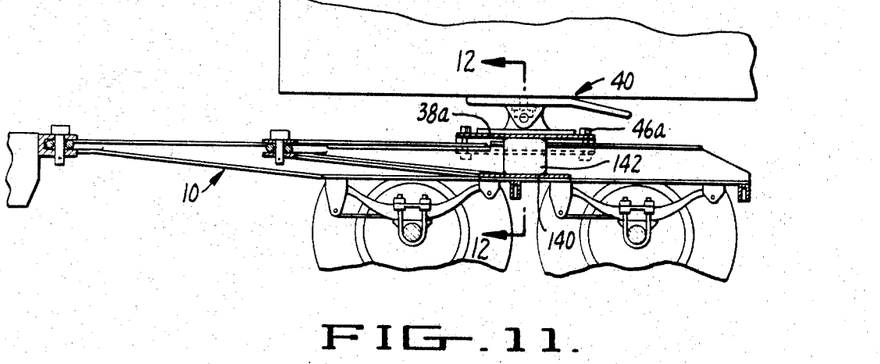
FIG. 11 is an elevational view, partially in section, illustrating a pair of the first embodiment dollies employed as illustrated in FIG. 10, but showing a modified air cushion supported fifth wheel on the dollies.
Figure 12:
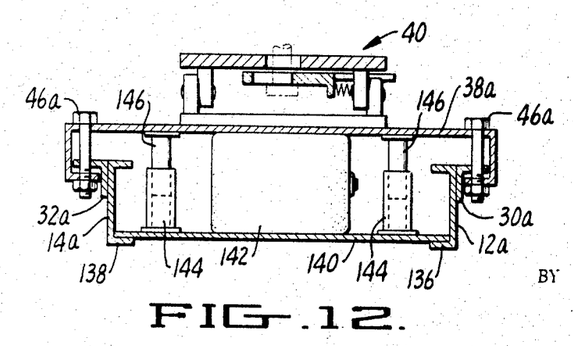
FIG. 12 is a sectional view taken on the plane designated by line 12—12 of FIG. 11.

FIGS. 11 and 12 illustrate an arrangement corresponding identically to that of FIG. 10, with the exception that the fifth wheel therein is supported on air cushion subassembly. This assembly is provided by removing the socket from the rearmost dolly and providing inwardly extending flanges 136 and 138, respectively, on the side members of the rearward chassis, designated by the numerals 12a and 14a. The flanges 136 and 138 slidably support a plate 140 which, in turn, supports an air bag 142 and a pair of vertically disposed guide tubes 144. The bag 142 has supported thereon a plate 38a corresponding in function to the aforedescribed plate 38. A fifth wheel 40 corresponding identically to the aforedescribed fifth wheel 40 is secured to the plate 38a. Guide rods 146 are fixed to and depend downwardly from the plate 38a to slidable internal engagement with the tubes 144. The plate 38a is locked at select longitudinal positions relative to the rearmost dolly by bolts 46a adapted to be extended through openings in the plate and select openings in rails 30a and 32a fixed to the side members 12a and 14a, respectively. The rails 30a and 32a correspond to the aforedescribed rails 30 and 32, respectively.

From the foregoing, it will be appreciated that in the FIGS. 11 and 12 embodiments, the fifth wheel removed from the parent assemblage of dollies must be that of the forward dolly. After thus removing the fifth wheel, the remaining operation of the assemblage corresponds to that described with respect to FIG. 10. In the load carrying operation of the assemblage, however, the fifth wheel 40 is resiliently supported on the assemblage through the air bag 142. It is noted that the guide tubes and rods 144 and 146 and the bolts 46a permit resilient floating of the plate 38a on the bag 142 while preventing longitudinal movement of the plate 38a and the plate 140 relative to the side members 12a and 14a.

THE SECOND EMBODIMENT DOLLIES

Referring now to FIGS. 13 to 17, inclusive, the dolly illustrated therein is designated in its entirety by the numeral 150. Its basic components comprise: a chassis 152 having an open rearward end defining a socket; a forwardly converging tongue 154 fixed to and extending forwardly from the chassis; an axle 156 supported beneath the chassis on wheels 158; and, a trailing arm air suspension system 160 suspending the chassis on the axle. The chassis 152 is made up of a rigid generally rectangular structure comprised of side frame members 162 and 164 and transverse frame members 166 and 168. The member 166 is fixed to and extends between the members 162 and 164 in substantially coplanar relationship therewith. The member 168 is disposed beneath the level of the members 162 and 164 so as to define an open socket-like area therebetween. Upstanding portions 170 and 172 on the ends of the members 168 are fixed to the members 162 and 164, respectively, to fixedly secure the member 168 therebetween. These portions, as can be seen from FIG. 13, define forwardly converging internal surfaces at the open rearward end of the chassis 152. The latter surfaces, designated by the numerals 174 and 176, are adapted to mate with the external lateral surfaces on the tongue of a corresponding dolly, as can be seen by phantom line representation of the dolly tongue in FIG. 15.

Figure 13:
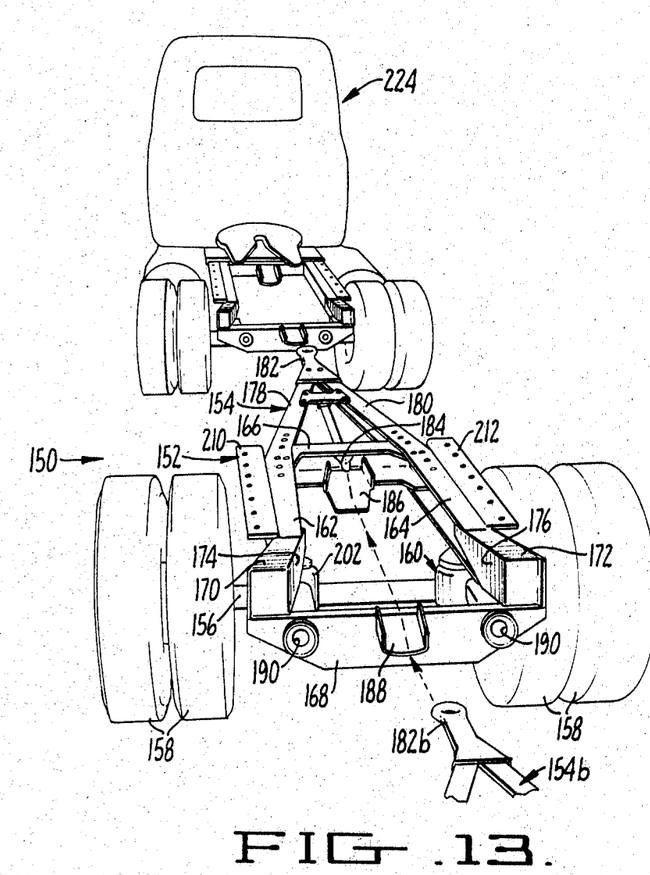
FIG. 13 is a perspective view illustrating a second embodiment of the dolly, with the load carrying fifth wheel removed therefrom for purposes of illustration, and a truck tractor to which it may be attached.

The tongue 154 is comprised of lateral members 178 and 180 fixed, respectively, to the members 162 and 164. The forward end of the tongue is defined by an eye 182 received on and fixed to the forward ends of the members 178 and 180. The eye 182 provides a draft connection for the dolly and, as will become more apparent from the subsequent discussion, also provides for coupling of the dolly in load sharing relationship with a corresponding secondary dolly.

Figure 15:
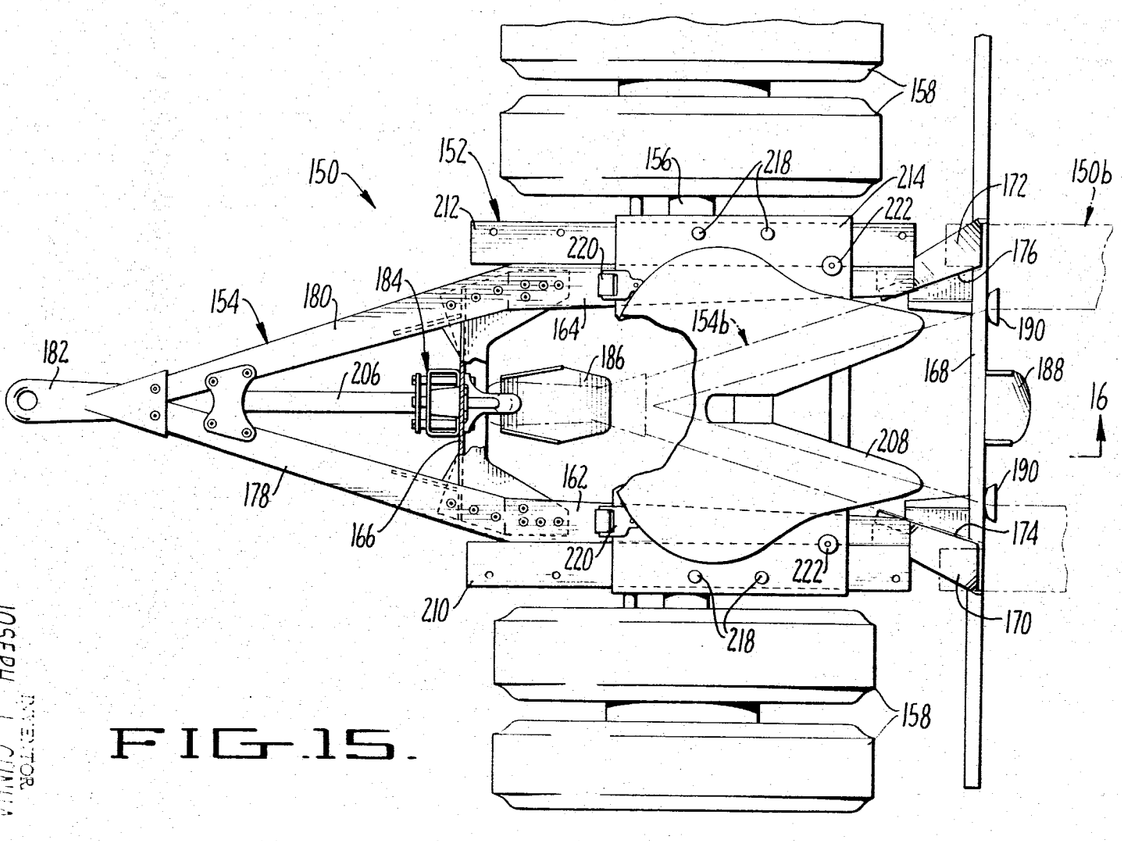
FIG. 15 is a plan view, with parts thereof broken away, illustrating one of the second embodiment dollies and, by way of phantom line representation, the manner in which a corresponding dolly may be nested in load sharing relationship therewith.

The socket formed in the rearward end of the chassis 152 is designed to nestingly receive the tongue of a corresponding secondary dolly in much the same manner as the socket defined by the aforedescribed channel members 74 and 76 of the first embodiment dolly. It differs from the socket in the first embodiment dolly, however, in that it is much more abbreviated. This can be seen from the fact that the only tongue engaging elements of the socket comprise the upstanding portions 170 and 172 and a pintle hook coupling 184 mounted on the member 166. The coupling 184 is positioned to automatically assume locked engagement with the eye of a corresponding secondary dolly upon receipt of the tongue of such a secondary dolly in the socket, as illustrated in FIG. 15. A guide 186 is mounted on the coupling 184 to automatically direct the eye of a secondary dolly into engagement with the coupling. A detailed disclosure of a coupling and guide corresponding substantially to the coupling 184 and guide 186 may be found in the aforementioned copending application Ser. No. 683,575.

Figure 16:
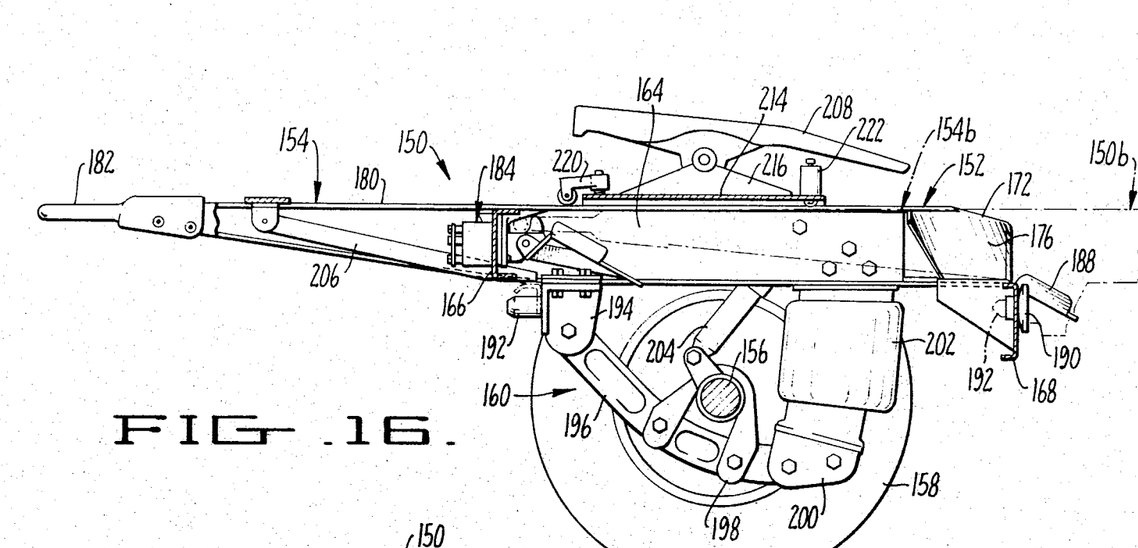
FIG. 16 is a sectional view of the second embodiment dolly taken on the plane designated by line 16—16 of FIG. 15.
Figure 17:
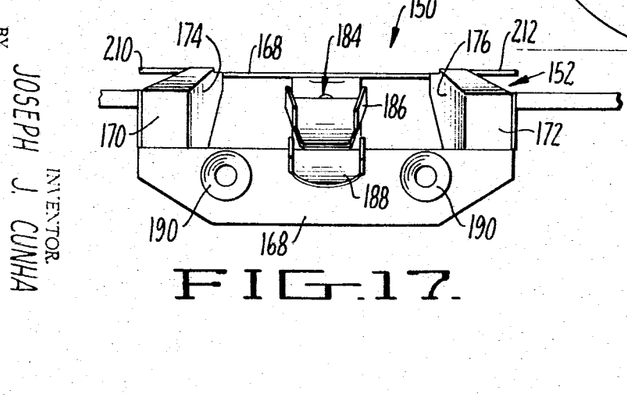
FIG. 17 is a rear end view of the chassis of one of the second embodiment dollies, with parts thereof broken away.

In addition to the aforedescribed open rearward socket structure in the chassis 152, the rearward end of the chassis also supports, on the frame member 168, a centrally disposed guide 188 and a pair of sockets 190 disposed, respectively, to either side of the longitudinal centerline of the chassis. The guide 188 is designed to direct and lift the eye of a secondary dolly directed towards the chassis upwardly and into the open socket-like portion defined above the member 168. It also, as will become more apparent subsequently, functions to lift the support leg for such a secondary dolly. The sockets 190 are provided to receive pins 192 fixed to and extending forwardly from such a secondary dolly. These pins, as can be seen from FIG. 16, are fixedly mounted on and extend forwardly from trailing arm hangers 194 for the air suspension system 160. The hangers 194 are fixedly mounted on the chassis 152. When the pins 192 of a secondary dolly are received within the sockets 190, as illustrated by the phantom line representation in FIG. 16, the pin and socket interengagement prevents relative elevational movement between the chassis of the respective dollies.

The air suspension system 160 corresponds identically to that disclosed and described in detailed in the aforementioned copending application Ser. No. 683,575. It comprises a pair of trailing arm air suspension assemblies disposed, respectively, at either side of the chassis 152. These assemblies are mirror images of each other and only one is shown in the drawings. Each comprises, as its basic elements: one of the hangers 194; a trailing arm 196 journalled to and extending rearwardly from the hanger; a stirrup 198 connecting the intermediate portion of the arm to the axle 156; an air bag pedestal 200 mounted on the distal end of the arm 196; and, an air bag 202 mounted in interposed relationship between the pedestal 200 and the chassis 152. The overall suspension assembly is completed by a pair of shock absorbers 204 mounted, respectively, to either side of the longitudinal centerline of the dolly. Each of the shock absorbers is operatively interposed between the axle 156 and the chassis 152.

The aforementioned support leg for the dolly 150 is designated by the numeral 206. It is of relatively conventional nature and pivotally secured to the tongue 154 for movement between a retracted position, as illustrated in FIG. 16, and an extended position (not illustrated) wherein it supports the tongue in a generally horizontal position. The pivotal mounting for the leg is of the type which functions to lock the leg in an extended position so long as load is imparted thereto and to release the leg for retraction upon the lifting of load therefrom. As a result, when the tongue is lifted, such as by engagement with the guide 188, the leg is released for swinging movement to the retracted position. When the tongue 154 is nested in engagement with the socket of a corresponding dolly, the transverse frame member 168 of the corresponding dolly functions to hold the leg in an elevated position. A detent, such as a conventional hook, is provided to selectively retain the leg from automatic extension when such extension is not desired.

The load supporting structure for the dolly 150 corresponds identically to the Fifth Wheel Support for the dolly disclosed in copending application Ser. No. 683,575. This structure comprises: a fifth wheel 208; a pair of apertured angle members 210 and 212 fixed to and extending laterally from the frame members 162 and 164, respectively; a plate 214 extending over the frame members 162 and 164 and the angle members fixed thereto; a trunnion support 216 fixed to the plate 214 and having the fifth wheel 208 mounted thereon for movement about a transverse axis; a plurality of pins 218 removably received in apertures provided therefor in the plate 214 for select engagement through the apertures and the angle members 210 and 212 to lock the plate against longitudinal movement relative to said members; and, roller and ball supports 220 and 222, respectively, mounted on the plate 214 for rolling engagement with the side frame members of the chassis 214. The roller and ball supports, as can be seen from application Ser. No. 683,575, support the plate 214 for rolling movement over the members 162 and 164 when the fifth wheel is in an unloaded condition.

Referring now specifically to FIG. 13, the dolly is shown therein in combination with a tractor 224. The tractor corresponds in all material respects to that disclosed in application Ser. No. 683,575. In use, it is designed to cooperate with the dolly 150 in a manner corresponding identically to the cooperation between the tractor and dolly in said copending application.

Figure 14:
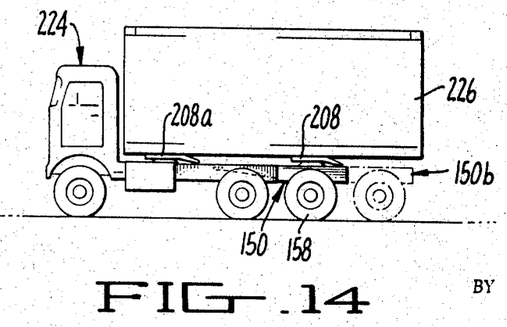
FIG. 14 is an elevational view illustrating one of the second embodiment dollies coupled in load sharing relationship wtih a chassis of a truck tractor to support a load carrying body and showing, in phantom line representation, the manner in which a second such dolly might be nested in load sharing relationship with the dolly coupled to the tractor.

The dolly 150 is also adapted to be nested with yet another corresponding dolly to provide a composite twin axle dolly. This is the nested condition illustrated by the phantom line representations in FIGS. 15 and 16. In this condition, the composite dollies may be put to any number of uses. For example, they may be coupled in load sharing relationship to the chassis of a tractor, as illustrated in FIG. 14. With the FIG. 14 arrangement, including the dolly illustrated in phantom lines, a four axle tractor is provided. For purposes of illustration, this tractor and the dollies coupled thereto are shown supporting a load carrying body 226. The body 226 is supported through means of fifth wheels 208 and 208a. The fifth wheel 208 is shown mounted on the foremost dolly, while the fifth wheel 208a is shown mounted on the chassis of the tractor. It should be understood that the slidable mountings for these fifth wheels facilitate their positioning at any desired location along the length of the composite chassis defined by the tractor chassis, together with the chassis of the nested dollies.

For reference purposes, the phantom line representation of the dolly in FIG. 14 is designated by the numeral 150b. It should be understood that this dolly, which might be referred to as a secondary dolly, corresponds identically in construction to the dolly 150. The tongue of the secondary dolly illustrated in FIGS. 15 and 16 is similarly designated by the numeral 154b for reference purposes. FIG. 13 also shows the tongue of a secondary dolly, in solid line representation, designated by the numeral 154b.

The dashed arrow line in FIG. 13 designates the path which the eye, designated 182b, on the tongue 154b would follow during the process of being coupled to the coupling 184 of the dolly 150. In this process, the eye 182b first slides over the guide 188. After the eye slides over the guide, the tongue 154b slides over the member 168 and, finally, the eye slides over the guide 186 and into engagement with the coupling 184. Simultaneously with movement of the eye 182 into engagement with the coupling 184, the pins 192 of the secondary dolly enter the sockets 190 and the converging lateral surfaces of the tongue 154b seat against the surfaces 174 and 176. The interengagement of the pins and sockets functions to secure the chassis of the respective dollies against relative elevational movement, while the engagement of the converging surfaces functions to limit movement of the respective chassis towards each other and secure them against relative lateral movement. Engagement of the eye 182b with coupling 184 also functions to lock the forward end of the tongue against elevational movement relative to the chassis 152.

While the second embodiment dollies are only illustrated in one load carrying environment, namely that of FIG. 14, it should be understood that they may be used in innumerable other environments. For example, they might be used in any of the environments suggested for the first embodiment dollies. It is also anticipated that both the first and second embodiment dollies may be used for purposes of adding one or more axles to a tractor in the manner suggested by FIG. 14.

It is here noted that the dollies of the first and second embodiments are designed to achieve substantially the same end result. Namely, both embodiments provide nestable running gear units which may be employed in innumerable environments to provide selectively variable axle combinations. The second embodiment is generally preferred over the first because of its relative ease of manufacture.

While the dollies have been illustrated and described in conjunction either with their employment as rearward running gear or nested forward running gear on semitrailer-like bodies, it is to be understood that all of the dollies are adapted for singular use as conventional dollies. Thus, where it is not desired to employ the dollies as herein specifically illustrated and described, the dollies may find worthwhile employment in conventional environments. In such employment, the most usual arrangement would be to use the dollies singularly with their fifth wheels located approximately above their axles.

From the foregoing description, it is believed apparent that the present invention enables the attainment of the objects initially set forth herein.

I claim:
1. A primary dolly comprising:
 (a) a wheel supported chassis;
 (b) a first coupling element secured to and disposed forwardly on said chassis;
 (c) a second coupling element secured to and disposed rearwardly on said chassis, said second coupling element being adapted for engagement against relative lateral movement with the first coupling element of a corresponding secondary dolly to maintain a longitudinally aligned relationship between said primary dolly and a corresponding secondary dolly;
 (d) selectively operable means adapted to lock said second coupling element in mutually engaged condition with the first coupling element of a corresponding secondary dolly;
 (e) a load supporting fifth wheel on said chassis; and,
 (f) means securing said fifth wheel to said chassis for selective longitudinal movement relative thereto, said means being adapted to permit locating of said fifth wheel at a position disposed between and supported on said chassis and the chassis of a corresponding secondary dolly having the first coupling element thereof in mutual engagement with the second coupling of said primary dolly and comprising, in part, an air cushion supporting said fifth wheel.

2. In combination with a load carrying body, running gear therefor comprising:
 (a) a pair of dollies having wheel supported chassis;
 (b) mutually engageable coupling means on said respective dollies adapted to secure the chassis thereof in longitudinally aligned tandem relationship and substantially prevent relative lateral movement therebetween;

(c) load supporting structure on said dollies comprising at least one fifth wheel having an upwardly facing load carrying table; and, (d) load transmitting structure adapted to couple said load supporting structure in supporting engagement with said body to transmit at least part of the load thereof to said dollies when the chassis of said dollies are secured in longitudinally aligned relationship by said coupling means, said load transmitting structure comprising:

(1) transmitting surfaces on the upper side of said table and under side of said body adapted to assume mated engagement; and, (2) mutually engageable locking elements carried, respectively, by said body and at least one of said dollies to secure said surfaces in mated engagement.

3. Running gear according to claim 2, wherein said mutually engageable elements comprise:

(a) a kingpin depending from the load transmitting surface on the underside of said body; and, (b) a detent supported on the table of said fifth wheel adapted to grip and lock said kingpin thereto.

4. Running gear according to claim 2, wherein said mutually engageable elements comprise:

(a) a tongue fixed to and extending longitudinally from one of said dollies; and, (b) a socket fixed to said body and adapted to receive said tongue in substantially immovable engagement therewith when said load transmitting surfaces are in mated engagement.

5. Running gear according to claim 2, further comprising:

(a) an air cushion supporting said fifth wheel on said dollies; and, (b) means mounting said air cushion and the fifth wheel supported thereby for selective longitudinal movement relative to said dollies when the chassis thereof are secured in longitudinally aligned relationship by said coupling means.

6. In combination with a load carrying body, running gear therefor comprising:

(a) at least one pair of dollies, said dollies each comprising:

(1) a wheel supported chassis substantially coplanar with that of the other dolly;

(2) a draft tongue fixed to and extending forwardly from said chassis;

(3) a socket formed on and opening rearwardly of said chassis, said socket being adapted to receive the tongue of the other dolly in seated engagement therewith wherein relative lateral movement between said socket and tongue is substantially prevented; and, (4) selectively operable means adapted to lock the tongue of the other dolly in seated engagement with the socket therein;

(b) load supporting means on said dollies; and, (c) means adapted to couple said load supporting means in engagement with said body to transmit at least part of the load thereof to said dollies when the tongue of one of said dollies is locked in seated engagement with the socket of the other of said dollies.

7. In combination with a load carrying body, running gear therefor comprising:

(a) a dolly having a wheel supported chassis with a draft tongue of V-shaped plan configuration fixed thereto and extending forwardly therefrom, said tongue having forwardly converging lateral surfaces defining the plan configuration thereof;

(b) a socket of V-shaped plan configuration secured beneath said body, said socket having converging lateral surfaces adapted to be nested in seated engagement with the forwardly converging lateral surfaces of said tongue to maintain said tongue and socket against relative lateral movement;

(c) means on said tongue and socket adapted to assume mutually engaged condition upon seating of the lateral surfaces of said tongue and socket in engagement to maintain said tongue and socket against relative elevational movement;

(d) means on said chassis and body adapted to assume mutually engaged condition upon seating of the lateral surfaces of said tongue and socket in engagement to transmit at least part of the load of said body to said chassis; and (e) means adapted to selectively lock the lateral surfaces of said tongue and socket in seated engagement.

8. A primary dolly comprising:

(a) a wheel supported chassis;

(b) a draft tongue fixed to and extending forwardly from said chassis;

(c) a socket formed in and opening rearwardly of said chassis in coplanar relationship to said tongue, said socket being adapted to nestably receive the tongue of a corresponding secondary dolly and having surfaces complementally engageable therewith to maintain a longitudinally aligned coplanar relationship between said primary dolly and a secondary dolly having the tongue thereof so received in the socket of said primary dolly; and, (d) selectively operable means adapted to lock the tongue of a secondary dolly in nested receipt with said socket.

9. A primary dolly according to claim 8 wherein:

(a) said tongue has forwardly converging exterior lateral surfaces and upper and lower surfaces; and, (b) the surfaces of the socket are complementally engageable with both the exterior lateral surfaces and the upper and lower surfaces of the tongue of a corresponding secondary dolly nestably received therein.

10. A primary dolly comprising:

(a) a wheel supported chassis;

(b) a draft tongue joined to and extending forwardly from the chassis, said tongue having forwardly converging exterior lateral surfaces adjacent the juncture thereof with the chassis;

(c) an open rearward end formed in the chassis for the receipt of the tongue of a corresponding secondary dolly, said end having forwardly converging interior lateral surfaces adjacent the rearmost portion thereof adapted, upon the receipt of the tongue of a corresponding secondary dolly in said end, to assume mutually engaged abutting relationship with the lateral surfaces of said tongue to limit movement of the respective chassis of said dollies toward each other and prevent relative lateral movement therebetween;

(d) longitudinally extending forwardly and rearwardly disposed elevational alignment means mounted on the chassis, said rearwardly disposed means being adapted to assume mutual engagement with the forwardly disposed means of a corresponding secondary dolly, upon receipt of the tongue of said secondary dolly in the open rearward end of said primary dolly, to prevent relative elevational movement between the chassis of said respective dollies; and, (e) first and second coupling means mounted on the dolly, said first means being adapted to assume mutual engagement with the second coupling means of a corresponding secondary dolly upon receipt of the tongue of said secondary dolly in the open rearward end of said primary dolly to maintain the tongue of said secondary dolly in received condition within the open rearward end of said primary dolly.

11. A primary dolly according to claim 10 wherein:
(a) the forwardly disposed elevational alignment means comprise at least one pair of sockets disposed, respectively, to either side of the longitudinal centerline of said chassis; and,
(b) the rearwardly disposed elevational alignment means comprise at least one pair of pins disposed, respectively, to either side of the longitudinal centerline of said chassis.

12. A primary dolly according to claim 10 wherein said first and second coupling means are mounted, respectively, on the chassis in forwardly spaced relationship to the converging interior lateral surfaces in the open rearward end thereof and on the tongue in forwardly spaced relationship to the exterior lateral surfaces thereon.

13. A primary dolly according to claim 10 wherein:
(a) the first coupling means is disposed on a member fixed to and extending transversely of the chassis;
(b) the second coupling means is disposed at the forward distal end of the tongue;
and further comprising a guide mounted on the chassis immediately adjacent the first coupling means; said guide being adapted to engage and direct the second coupling means of a corresponding secondary dolly into engagement with the first coupling means of said primary dolly upon movement of the tongue of said secondary dolly into received condition in the open rearward end of the chassis of said primary dolly.

14. In combination with a load carrying body, running gear therefor comprising:
(a) a dolly having a wheel supported chassis with a draft tongue secured thereto and extending forwardly therefrom;
(b) a fifth wheel mounted on said chassis, said fifth wheel having an upwardly facing load supporting table thereon formed with a key-slot opening laterally through an edge thereof and terminating in a closed end disposed generally centrally of the table;
(c) a load supporting surface on the underside of said body slidably engageable with the load supporting table of the fifth wheel;
(d) a kingpin and wedge mounted on and extending downwardly from the underside of said body for slidable receipt in the key slot of the load supporting table, said kingpin being securely engageable with the closed end of said key slot to maintain said load bearing surface in load transmitting engagement with said table and said wedge being disposed for simultaneous abutting engagement with said slot in spaced relationship to the generally centrally disposed closed end thereof to prevent relative rotational movement between said table and the underside of said body; and,
(e) means adapted to selectively impart pivotal movement to said chassis relative to the load supporting table of the fifth wheel about a generally vertical axis whereby, upon engagement of said kingpin and wedge with the key slot of the table, said chassis may be selectively turned relative to said body to vary the direction in which the draft tongue extends.

References Cited
UNITED STATES PATENTS

| | | | |
|---|---|---|---|
| 1,595,512 | 8/1926 | Glogger | 208—404 |
| 2,532,151 | 11/1950 | Dibert | 280—423 |
| 2,589,842 | 3/1952 | Mittell. | |
| 2,733,931 | 2/1956 | Reid et al. | |
| 3,108,822 | 10/1963 | Tantlinger et al. | 280—104.5 |
| 3,151,880 | 10/1964 | Black | 280—408 |
| 3,163,306 | 12/1964 | Bennett et al. | 280—423 X |
| 3,203,711 | 8/1965 | Cheal | 280—423 X |
| 3,246,912 | 4/1966 | Cunha | 280—407 |
| 3,312,479 | 4/1967 | Cunha | 280—407 |

FOREIGN PATENTS
837,772 6/1960 Great Britain.

LEO FRIAGLIA, Primary Examiner

U.S. Cl. X.R.
280—80, 407, 408, 423